(12) United States Patent
Li et al.

(10) Patent No.: US 11,494,948 B2
(45) Date of Patent: Nov. 8, 2022

(54) POINT CLOUD GEOMETRIC COMPRESSION METHOD BASED ON DEPTH AUTO-ENCODER

(71) Applicant: PEKING UNIVERSTIY SHENZHEN GRADUATE SCHOOL, Shenzen (CN)

(72) Inventors: Ge Li, Xili Town (CN); Wei Yan, Xili Town (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 345 days.

(21) Appl. No.: 16/929,374

(22) Filed: Jul. 15, 2020

(65) Prior Publication Data
US 2021/0019918 A1  Jan. 21, 2021

(30) Foreign Application Priority Data
Jul. 15, 2019  (CN) .......................... 201910635630.9

(51) Int. Cl.
*G06T 9/00* (2006.01)
*G06N 3/04* (2006.01)
(Continued)

(52) U.S. Cl.
CPC ........... *G06T 9/002* (2013.01); *G06N 3/0454* (2013.01); *G06N 3/084* (2013.01); *G06T 17/00* (2013.01)

(58) Field of Classification Search
CPC ....... G06T 9/002; G06T 17/00; G06N 3/0454; G06N 3/084
(Continued)

(56) References Cited

U.S. PATENT DOCUMENTS

| 2019/0051017 A1* | 2/2019 | Beek ....................... G06T 7/521 |
| 2019/0355152 A1* | 11/2019 | Li ........................... G06T 3/4084 |
| 2020/0145661 A1* | 5/2020 | Jeon ..................... H04N 19/136 |

OTHER PUBLICATIONS

Charles R. Qi, Hao Su, Kaichun Mo, Leonidas J. Guibas. PointNet: Deep Learning on Point Sets for 3D Classification and Segmentation. IEEE Conference on Computer Vision & Pattern Recognition. 2017.

(Continued)

*Primary Examiner* — Michael R Neff
(74) *Attorney, Agent, or Firm* — Burr & Forman LLP

(57) ABSTRACT

The invention discloses a point cloud geometric compression method based on a depth auto-encoder, which comprises the following steps of: (1) point cloud preprocessing: collecting a type of point cloud to be compressed as a training set, and normalizing the training set into a unit circle; (2) point cloud down-sampling: down-sampling the point clouds in the training set so that each point cloud have the same point number m and each point in the point cloud has (x, y, z) three-dimensional coordinates; and adopting a farthest point down-sampling method by randomly selecting a point for the first time and then selecting the point farthest away from the selected point set every time to add into the selected point set until the selected point number meets the requirement; (3) training a compression model: inputting the point cloud sampled in step (2) into a point cloud geometric compression framework based on a depth auto-encoder for training; and (4) geometric compression of the point cloud: applying the trained compression framework to the geometric compression of all the point clouds of the type. The method can not only obtain a good compression effect but also adapt to a new point cloud type more quickly.

4 Claims, 4 Drawing Sheets

(51) Int. Cl.
*G06N 3/08* (2006.01)
*G06T 17/00* (2006.01)

(58) Field of Classification Search
USPC .......................................................... 382/166
See application file for complete search history.

(56) References Cited

OTHER PUBLICATIONS

Johannes Balle, David Minnen, Saurabh Singh, Sung Jin Hwang, Nick Johnston. Variational Image Compression with a Scale Hyperprior. 2018.

* cited by examiner

POINT CLOUD GEOMETRIC COMPRESSION METHOD BASED ON DEPTH AUTO-ENCODER

TECHNICAL FIELD

The invention belongs to the field of point cloud data compression, and particularly to a point cloud geometric compression method based on a depth auto-encoder.

BACKGROUND ART

With the rapid development of three-dimensional scanning equipment, it is possible to digitalize three-dimensional information in the real world rapidly, and a point cloud is becoming an effective way to express three-dimensional scenes and three-dimensional surfaces of objects. Compared with the traditional two-dimensional pictures and videos, the point cloud is usually dispersed in a three-dimensional space in the form of points, supporting free viewpoint and multi-angle viewing and realizing the user experience of a three-dimensional world, and the application is wider and wider; and the point cloud is obtained by sampling the surface of an object by a three-dimensional scanning device, wherein the number of points is large, and each point contains (x, y, z) geometric information, color, texture, and other attribute information, and the information amount is large, and therefore the data amount of the point cloud is very large. Considering the large data volume of the point cloud and the limited bandwidth of network transmission, point cloud compression is an imperative task.

Point cloud compression is mainly categorized into geometric compression and attribute compression, wherein point cloud geometric compression is an active and promising research field.

The existing point cloud geometric compression method is mainly a geometric compression method based on octree division. Firstly, the original point cloud is quantized, and a quantization coefficient is artificially set to reduce the points of the original point cloud and repeated points are removed. And then spatial decomposition is performed on the point cloud by using the octree, and then whether each octree child node contains a point or not is recorded, and the point cloud is recorded as an occupation code. The processing efficiency of the method is high but the compression performance needs to be improved. And the method does not have the capability of quickly adapting to a certain type of specific point cloud.

In recent years, machine learning methods for three-dimensional point clouds have greatly developed. For example, in point cloud recognition and segmentation tasks, depth learning based methods have surpassed traditional manual feature based methods, and great success in three-dimensional reconstruction has been achieved. This kind of data-driven based method can quickly adapt to a particular kind of point cloud, learning its unique characteristics and achieve good results in a particular task. But this method is hardly used in point cloud geometric compression. In general, the design of the traditional point cloud encoder needs several months, but the method based on depth learning can quickly adapt to different types of data by learning a large amount of data so that a large amount of labor cost can be saved, and a good compression effect can be obtained, and the method based on depth learning has achieved certain success in the fields of picture and video compression. In a comprehensive view, the existing point cloud geometric compression method has the conditions that the compression efficiency needs to be improved, and the development time is long, and the method does not adapt to new data sets quickly and the like.

SUMMARY OF THE INVENTION

In order to overcome the defects of the prior art, the invention provides a point cloud geometric compression method based on a depth auto-encoder. The method breaks through a traditional point cloud geometric compression framework and a new point cloud geometric compression framework based on a neural network is provided such that a large amount of data can be used for training and the performance of point cloud geometric compression is further improved.

The invention adopts the following technical scheme:
a point cloud geometric compression method based on a depth auto-encoder, which comprises the following specific steps:
(1) point cloud preprocessing: collecting a type of point cloud to be compressed as a training set, and normalizing the training set into a unit circle;
(2) point cloud down-sampling: down-sampling the point clouds in the training set so that each point cloud has a same point number m, and each point in the point cloud has (x, y, z) three-dimensional coordinates, wherein the down-sampling method adopts a farthest point down-sampling method by randomly selecting a point for the first time and then selecting a point farthest away from the selected point set every time to add into the selected point set until the selected point number meets the requirement;
(3) training a compression model: inputting the point cloud sampled in step (2) into a point cloud geometric compression framework based on a depth auto-encoder for training; and
(4) geometric compression of a point cloud: the trained compression framework being applied to the geometric compression of all the point clouds of the type.

The point cloud geometric compression framework based on a depth auto-encoder in step (3) comprises a specific training process of:
(3-1) inputting the point cloud x sampled in step (2) into an encoder E based on a neural network to obtain a coded codeword y;
(3-2) quantizing the codeword y generated through the encoder E to obtain a quantized codeword ŷ:

$$\hat{y} = [y] \quad (1)$$

wherein because the derivative of the rounding quantization function is zero or infinite, and gradient backpropagation cannot be carried out, and approximation processing is needed for the derivative of the rounding quantization function:

$$\frac{d}{dy}[y] = \frac{d}{dy} r(y). \quad (2)$$

where r(y) is an approximation function, and symbol d stands for differentiation and one simple option is:

$$r(y) = y + u. \quad (3)$$

where u is random noise between [−0.5, 0.5], and the quantization is replaced by an equation (3) in the training process, and the backpropagation can be successfully carried out, and after the training is finished, an original rounding quantization function is used in the actual compression process;

(3-3) performing probability modeling on the quantized codeword ŷ, wherein by using the algorithm described in the literature (Ballé J, Minnen D, Singh S, et al. Variational image compression with a scale hyperprior[J]. 2018.), the probability model $p_{\hat{y}}(\hat{y})$ of the codeword ŷ is obtained, and the information entropy of the codeword ŷ is calculated according to the probability model as the code rate loss R of the model training;

$$R=E[-\log_2 p_{\hat{y}}]. \quad (4);$$

where E is an expectation function; and (3-4) decoding the quantized codeword ŷ, wherein the decoder D is composed of a fully connected neural network and the codeword is decoded into a reconstructed point cloud; and errors between the reconstructed point cloud and the original input point cloud are calculated by using a Chamfer distance ($d_{CH}$):

$$d_{CH}(S_1, S_2) = \sum_{x \in S1} \min_{y \in S2}\|x-y\|_2^2 + \sum_{y \in S2} \min_{x \in S1}\|x-y\|_2^2. \quad (5)$$

where $S_1$ and $S_2$ are respectively the input point cloud and the reconstructed point cloud; and finally, the rate-distortion loss function of the compression framework is:

$$L[f_e, f_d, p_{\hat{y}}] = \lambda E[d_{CH}(S_1, S_2)] + E[-\log_2 p_{\hat{y}}], \quad (6)$$

where λ is a Lagrangian coefficient that weighs code rate and distortion, and $f_e$ represents a non-linear function of the encoder, and $f_d$ represents a non-linear function of the decoder, and $p_{\hat{y}}$ is the probability model of the codeword. The entire network framework optimizes the rate-distortion loss function shown in equation (6) during training.

The point cloud geometric compression method based on the depth auto-encoder has the following beneficial effects.

1. According to the point cloud geometric compression method of the present invention, a point cloud geometric compression framework based on depth learning is provided. For a given type of point cloud with similar geometric shapes to be compressed, a geometric encoder and decoder are obtained through depth auto-encoder learning so that a large number of code rates can be saved and high reconstruction quality can be obtained.

2. Compared with traditional geometric encoders and decoders based on manual design, this data-driven method can not only obtain a good compression effect, but also adapt to a new point cloud type more quickly.

3. At present, the three-dimensional point cloud model is more and more applied to real life and has a large number of point clouds which can be used as training sets, so that the application range of the present invention is very wide.

DETAILED DESCRIPTION OF THE INVENTION

The present invention will now be described in detail with reference to the accompanying drawings and examples.

Figure 1:
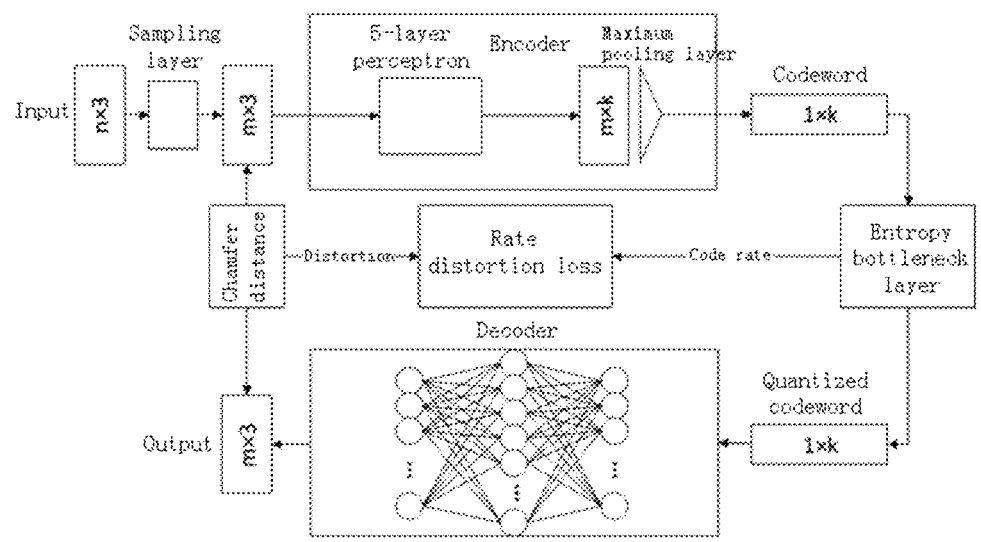
FIG. 1 is a framework flow diagram of a depth auto-encoder based point cloud geometric compression method of the present invention.

The invention provides a depth auto-encoder based point cloud geometric compression method, the framework of which mainly comprises a neural network-based encoder, a quantizer, an entropy estimation module, and a neural network-based decoder. According to the method, with regard to the characteristics of a certain type of specific point cloud, and encoder adapting to the characteristics can be quickly learned, and meanwhile, a good compression effect can be obtained. FIG. 1 is a framework flow diagram of a method for point cloud compression based on a depth auto-encoder of the present invention, including the following steps of:

(1) preprocessing point clouds: collecting a type of point cloud to be compressed as a training set, and normalizing the training set into a unit circle;

(2) point cloud down-sampling: wherein this step corresponds to the sampling layer in FIG. 1; a point cloud x is given to be processed, which is the input in FIG. 1, with n points and (x, y, z) three-dimensional coordinates for each point; the point cloud x is represented by a matrix of dimensions n×3; because the point number of point cloud required at different code rate points is different, the original point cloud needs to be artificially down-sampled; the down-sampling method is the farthest point down-sampling method; the point cloud x to be processed has n points, denoted by sets as $\{x_1, x_2, \ldots, x_n\}$, and a subset $\{x_{i1}, x_{i2}, \ldots, x_{im}\}$ of the original point cloud is obtained by using the farthest point down-sampling method, so that $x_{ij}$ is the most distant point from point set $\{x_{i1}, x_{i2}, \ldots, x_{ij-i}\}$ selected in the previous layer and $x_{ij}$ is added to the selected point set; compared with a random down-sampling method, the point density of the point cloud sampled by the method is more uniform, and the geometric shape of the original point cloud is favorably maintained; and after the down-sampling, the original n×3 point cloud becomes m×3 point cloud.

(3) training a compression model:

(3-1) setting the point number of the point cloud subjected to down-sampling as m, and expressing the same by using a matrix with the dimension of m×3, wherein, the down-sampled point cloud is encoded into k codewords, denoted y, by an encoder E consisting of a neural network; the encoder is based on a neural network framework improvement described in the literature (Charles R Q, Hao S, Mo K, et al. PointNet: Deep Learning on Point Sets for 3D Classification and Segmentation[C]//IEEE Conference on Computer Vision & Pattern Recognition. 2017.); the encoder consists of a 5-layer perceptron, and after a 5-layer perceptron, the features of each point are transformed from original three-dimensional coordinates to k-dimensional features, so the m×k matrix is used for representation; and then maximum pooling is performed on the m×k dimensional matrix (corresponding to the maximum pooling layer in FIG. 1 to obtain a final 1×k dimensional codeword y;

(3-2) quantizing the coded 1×k dimensional codeword y:

$$\hat{y}=[y]. \quad (1)$$

wherein, because the derivative of the rounding quantization function is zero or infinite, gradient backpropagation cannot be carried out, and approximation processing is needed for the derivative of the rounding quantization function:

$$\frac{d}{dy}[y] = \frac{d}{dy}r(y). \quad (2)$$

where r(y) is an approximation function and one simple option is:

$$r(y)=y\ u. \quad (3)$$

where u is random noise between [−0.5, 0.5]; in the training process, the quantization is replaced by the equation (3), so that the backpropagation can be successfully carried out; and after the training is finished, the original rounding quantization function is used in the actual compression process;

(3-3) entropy bottleneck layer being used for quantizing the codeword y to obtain ŷ, and then probability modeling being performed on the quantized codeword y, and the algorithm recorded in literature (Ballé J, Minnen D, Singh S, et al. Variational image compression with a scale hyperprior [J]. 2018.) being used to find the probability model $p_{\hat{y}}(\hat{y})$ of the codeword ŷ, and the information entropy of the codeword ŷ being calculated according to the probability model as the code rate loss of the model training:

$$R=E[-\log_2 p_{\hat{y}}] \quad (4);$$

and (3-4) The quantized codeword ŷ being decoded, wherein, the decoder D is composed of three layers of fully connected neural networks such that the codeword is decoded into a reconstructed point cloud, and the reconstructed point cloud is represented by an m×3 dimensional matrix, and the point cloud is the output in FIG. 1; and errors between the reconstructed point cloud and the original input point cloud are calculated by using a Chamfer distance ($d_{CH}$):

$$d_{CH}(S_1, S_2) = \sum_{x \in S1} \min_{y \in S2}\|x - y\|_2^2 + \sum_{y \in S2} \min_{x \in S1}\|x - y\|_2^2. \quad (5)$$

where $S_1$ and $S_2$ are the input point cloud and the reconstructed point cloud respectively; and finally, the rate-distortion loss function of the compression framework is:

$$L[f_e, f_d, p_{\hat{y}}]=\lambda E[d_{CH}(S_1, S_2)]+E[-\log_2 p_{\hat{y}}], \quad (6)$$

and wherein λ is a Lagrangian coefficient that weighs code rate and distortion, and $f_e$ represents the non-linear function of the encoder, and $f_d$ represents the non-linear function of the decoder, and $p_{\hat{y}}$ is the probability model of the codeword; and the overall network framework optimizes the loss function (corresponding to the rate-distortion loss in FIG. 1) shown in equation (6) during training.

(4) Geometric compression of point clouds: the trained compression framework being applied to the geometric compression of all the point clouds of this type, wherein the main steps are as follows: firstly, preprocessing and downsampling a point cloud to be compressed, which is the same as the steps (1) and (2); encoding the down-sampled point cloud by using a trained encoder and quantizing a codeword obtained by encoding, wherein the quantization at the moment does not need approximate processing; encoding the quantized codeword by an arbitrary entropy encoder to obtain a code stream for storage and transmission; and during decoding, entropy decoding being carried out on a code stream to obtain a codeword, and the codeword being decoded by using a decoder after training to obtain a reconstructed point cloud.

Figure 2:
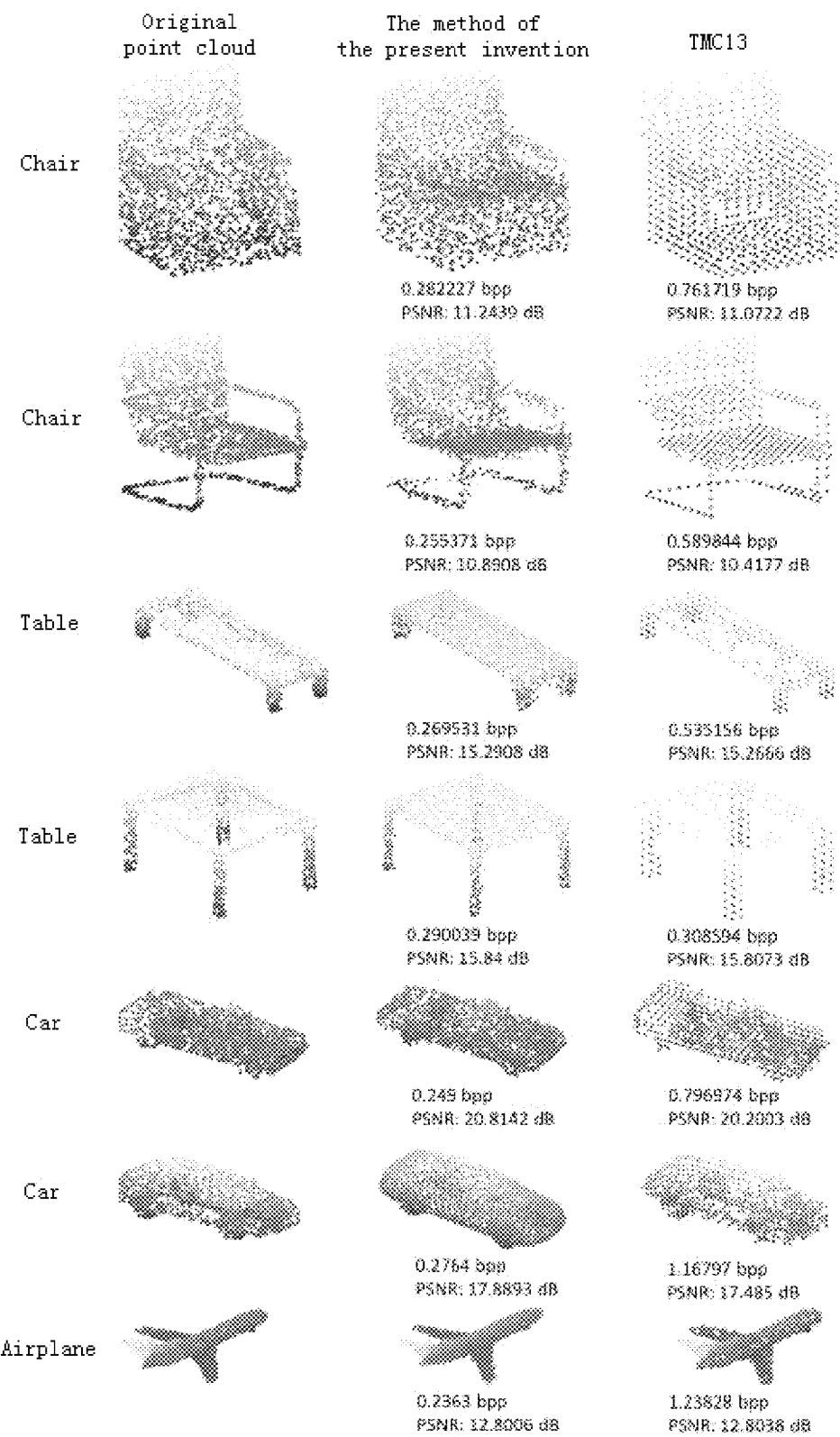
FIG. 2 is a graph of compression subjective performance comparison of a test model TMC 13 proposed at the 125th meeting of the Moving Picture Experts Group (MEPG Organization) in an embodiment of the present invention, wherein, the left column is the original point cloud, and the middle column is the result of the method according to the present invention, and the right column is the TMC 13 result.

FIG. 2 is a graph of compression subjective performance comparison of a conventional method TMC 13 (proposed at the 125th meeting of the MEPG Organization) with a point cloud geometric compression method based on depth auto-encoder of the present invention, wherein, the left column is the original point cloud, and the middle column is the result of the method according to the present invention, and the right column is the TMC 13 result. The point clouds from top to bottom are respectively a chair type point cloud, a table type point cloud, a car type point cloud, and an airplane type point cloud. From top to bottom, different types of point clouds use this method to obtain the number of bits required to encode each point as 0.28227, 0.255731, 0.269531, 0.290039, 0.249, 0.2764, and 0.2363 respectively, and the peak signal-to-noise ratios obtained are 11.2439 dB, 10.8908 dB, 15.2908 dB, 15.84 dB, 20.8142 dB, 17.8893 dB and 12.8006 dB. The number of bits required to encode each point using TMC 13 is 0.761719 dB, 0.589844 dB, 0.535156, 0.308594, 0.796974, 1.16797 and 1.23828 respectively from top to bottom, and the peak signal-to-noise ratios are 11.0722 dB, 10.4177 dB, 15.2666 dB, 15.8073 dB and 20.2003 dB, 17.485 dB and 12.8038 dB respectively. As can be seen from the figure, the number of points of the reconstructed point cloud obtained by the point cloud geometric compression method is more; the distribution is denser; the point cloud is closer to the original point cloud; and the codeword required under almost the same peak signal-to-noise ratio (PSNR) is far smaller than a TMC 13 result.

Figure 3A:
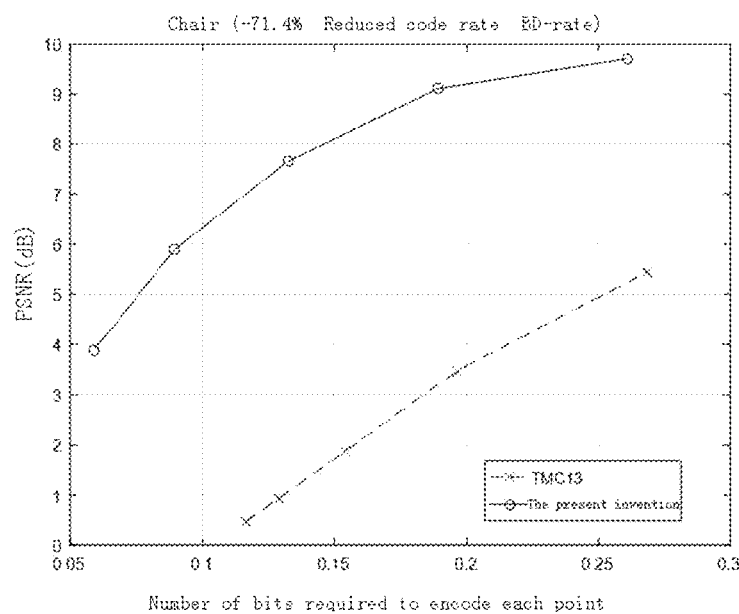
FIG. 3a is a graph of compression objective performance comparison of the present invention with a conventional test model TMC 13 (presented at the 125th meeting of the MEPG organization) on a chair data set.
Figure 3B:
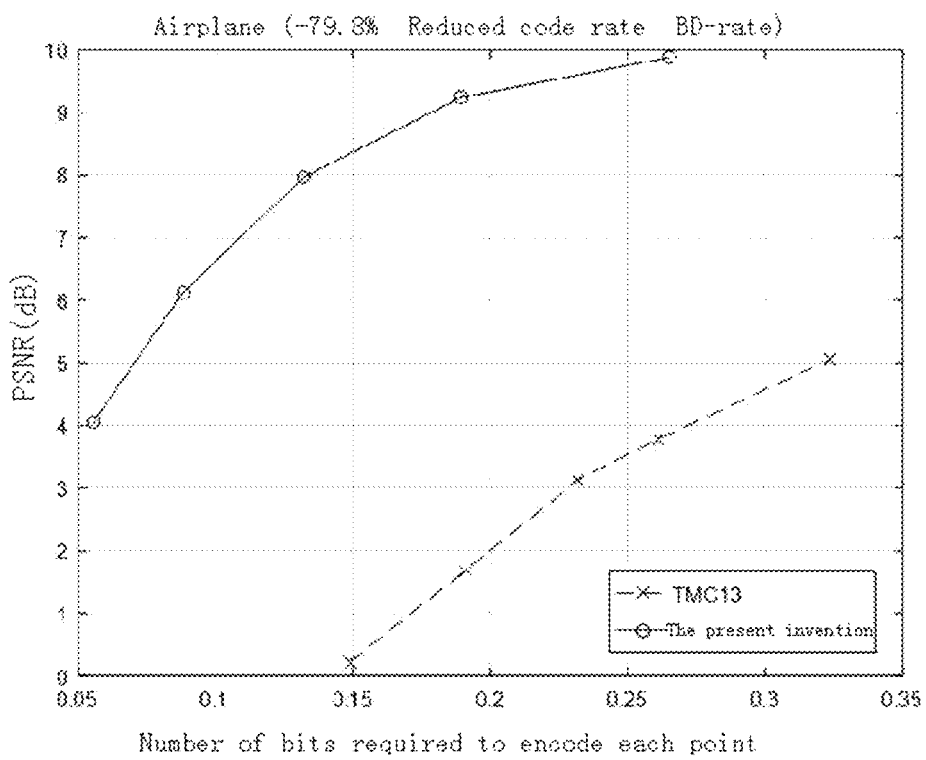
FIG. 3b is a graph of compression objective performance comparison of the present invention with a conventional test model TMC 13 (presented at the 125th meeting of the MEPG organization) on an airplane data set.
Figure 3C:
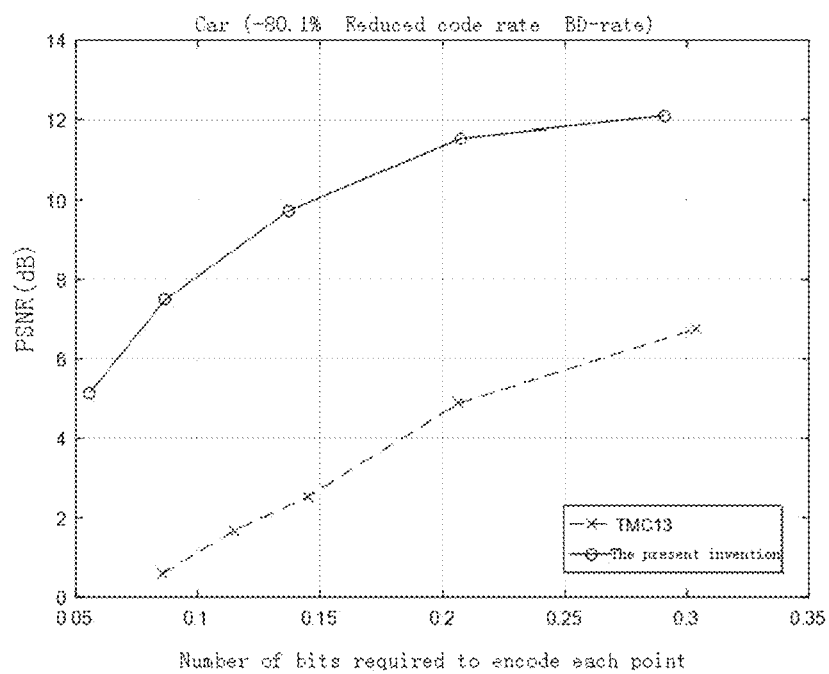
FIG. 3c is a graph of compression objective performance comparison of the present invention with a conventional test model TMC 13 (presented at the 125th meeting of the MEPG organization) on a car data set.
Figure 3D:
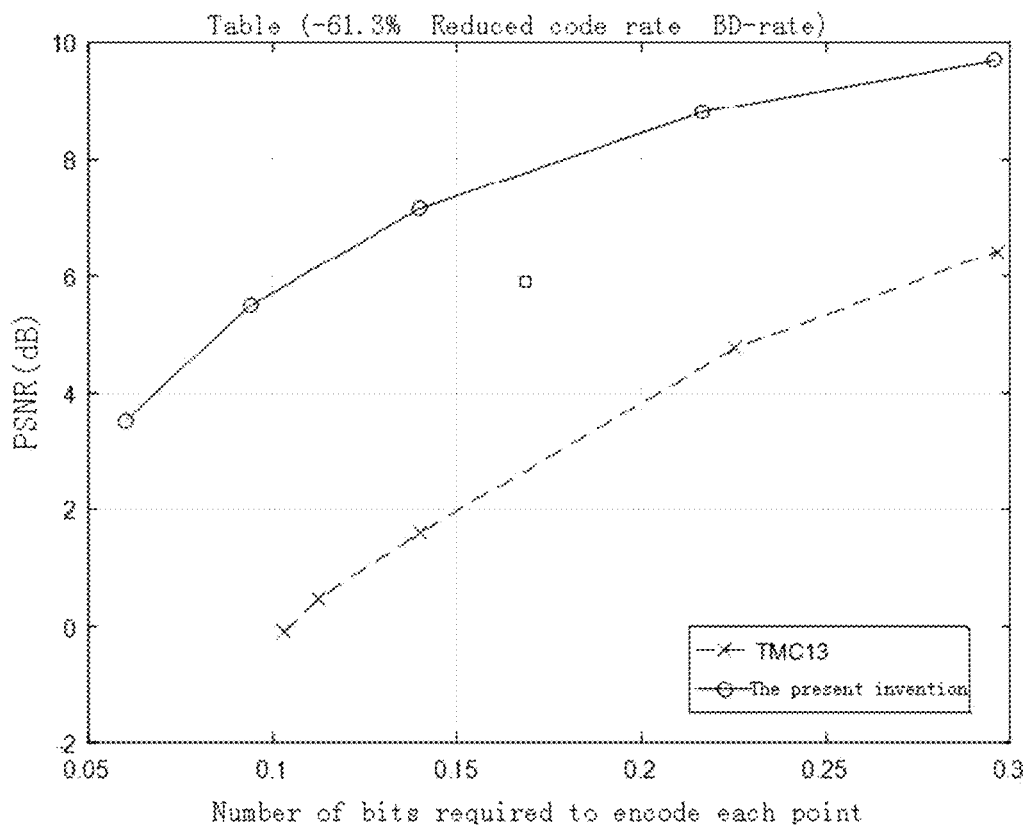
FIG. 3d is a graph of compression objective performance comparison of the present invention with a conventional test model TMC 13 (presented at the 125th meeting of the MEPG organization) on a table data set.

In order to verify the effect of the point cloud geometric compression method based on the depth auto-encoder of the invention, a ShapeNet data set is used. Four types of point clouds are used for experiments, and the results are shown in FIGS. 3a to 3d. Wherein FIG. 3a is a graph of compression objective performance comparison of the present invention with a conventional test model TMC 13 (presented at the 125th meeting of the MEPG organization) on a chair data set; FIG. 3b is a graph of compression objective performance comparison of the present invention with a conventional test model TMC 13 (presented at the 125th meeting of the MEPG organization) on an airplane data set; FIG. 3c is a graph of compression objective performance comparison of the present invention with a conventional test model TMC 13 (presented at the 125th meeting of the MEPG organization) on a car data set; FIG. 3d is a graph of compression objective performance comparison of the present invention with a conventional test model TMC 13 (presented at the 125th meeting of the MEPG organization) on a table data set. As can be seen, with regard to the four types of point clouds, the coding performance of the present invention lies in that it exceeds that of TMC 13 at all code rate points. Specifically, as can be seen from FIG. 3a, the present invention achieves a gain of 71.4% compared to TMC 13 on the chair data set; as can be seen from FIG. 3d, the present invention achieves a gain of 61.3% on the table data set; as can be seen from FIG. 3c, the present invention achieves a gain of 80.1% on the car data set; and as can be seen from FIG. 3d, the invention achieves a gain of 79.8% on the airplane data set.

The method provided by the invention reduces the code rate by about 70% compared with a TMC 13 point cloud encoder proposed by the MEPG organization in the aspect of point cloud geometric compression.

The subjective quality comparison is shown in FIG. 2. Under similar reconstruction quality, the code rate of the method provided by the invention is smaller than the compression result of the TMC 13, and the advantages of compression performance are obvious and prominent.

It should be noted that the examples are disclosed to aid in a further understanding of the present invention, but those skilled in the art will appreciate that various alternatives and modifications are possible without departing from the spirit and scope of the invention and the appended claims. Therefore, it is intended that the invention not be limited to the embodiments disclosed, but that the scope of the invention be determined by the claims appended hereto.

The invention claimed is:

1. A point cloud geometric compression method based on a depth auto-encoder, wherein, the method comprises the following steps of:
    (1) point cloud preprocessing: collecting a type of point cloud to be compressed as a training set, and normalizing the training set into a unit circle;
    (2) point cloud down-sampling: down-sampling the point clouds in the training set so that each point cloud has a same point number m, and each point in the point cloud has (x, y, z) three-dimensional coordinates, wherein the down-sampling method adopts a farthest point down-sampling method by randomly selecting a point for the first time and then selecting a point farthest away from the selected point set every time to add into the selected point set until the selected point number meets the requirement;
    (3) training a compression model: inputting the point cloud sampled in step (2) into a point cloud geometric compression framework based on a depth auto-encoder for training; and
    (4) geometric compression of a point cloud: the trained compression framework being applied to the geometric compression of all the point clouds of the type.

2. The method for point cloud geometric compression according to claim 1, wherein, the specific down-sampling process in step (2) is as follows:
    a point cloud x with n points and (x, y, z) three-dimensional coordinates for each point is given to be processed; the point cloud x is represented by a matrix of n×3 dimensions; because the point number of point cloud required at different code rate points is different, the original point cloud needs to be artificially down-sampled; the down-sampling method is the farthest point down-sampling method; the point cloud x to be processed has n points, denoted by sets as $\{x_1, x_2, \ldots, x_n\}$, and a subset $\{x_{i1}, x_{i2}, \ldots, x_{im}\}$ of the original point cloud is obtained by using the farthest point down-sampling method, so that $x_{ij}$ is the most distant point from point set $\{x_{i1}, x_{i2}, \ldots, x_{ij-1}\}$ selected in the previous layer and $x_{ij}$ is added to the selected point set; and the process is iterated until the selected points meet the requirements.

3. The method for point cloud geometric compression according to claim 1, wherein, the training compression framework in step (3) mainly comprises the following steps of:
    (3-1) setting the point number of the point cloud subjected to down-sampling as m, and expressing the same by using a matrix with the dimension of m×3; and encoding the point cloud subjected to down-sampling into k codewords through an encoder E consisting of a neural network, and recording the k codewords as y;
    (3-2) quantizing the codeword y obtained by encoding:

$$\hat{y}=[y], \qquad (1)$$

wherein because the derivative of the rounding quantization function is zero or infinite, gradient backpropagation cannot be carried out, and approximation processing is needed for the derivative of the rounding quantization function:

$$\frac{d}{dy}[y] = \frac{d}{dy}r(y), \qquad (2)$$

where r (y) is an approximation function, and one simple option is:

$$r(y)=y+u, \qquad (3)$$

where u is random noise between [−0.5, 0.5], and the quantization is replaced by an equation (3) in the training process, and the backpropagation can be successfully carried out, and after the training is finished, an original rounding quantization function is used in the actual compression process;

(3-3) performing probability modeling on the quantized codeword $\hat{y}$ to obtain a probability model $p_{\hat{y}}(\hat{y})$ of the codeword $\hat{y}$, and calculating information entropy of the codeword $\hat{y}$ according to the probability model as code rate loss of model training;

$$R=E[-\log_2 p_{\hat{y}}], \qquad (4);$$

and (3-4) decoding the quantized codeword $\hat{y}$, wherein the decoder D is composed of a fully connected neural network and the codeword is decoded into a reconstructed point cloud; and errors between the reconstructed point cloud and the original input point cloud are calculated by using a Chamfer distance ($d_{CH}$):

$$d_{CH}(S_1, S_2) = \sum_{x\in S1}\min_{y\in S2}\|x-y\|_2^2 + \sum_{y\in S2}\min_{x\in S1}\|x-y\|_2^2, \qquad (5)$$

where $S_1$ and $S_2$ are respectively the input point cloud and the reconstructed point cloud; and finally, the rate-distortion loss function of the compression framework is:

$$L[f_e, f_d, p_{\hat{y}}]=\lambda E[d_{CH}(S_1,S_2)]+E[-\log_2 p_{\hat{y}}], \qquad (6)$$

where $\lambda$ is a Lagrangian coefficient that weighs code rate and distortion, and $f_e$ represents a non-linear function of the encoder, and $f_d$ represents a non-linear function of the decoder, and $p_{\hat{y}}$ is the probability model of the codeword.

4. The method for point cloud geometric compression based on a depth auto-encoder according to claim 1, wherein, the specific process of the point cloud geometric compression in step (4) is as follows:

the trained compression framework is applied to the geometric compression of all the point clouds of the type, comprising, firstly, preprocessing and down-sampling a point cloud to be compressed, which is the same as the steps (1) and (2); encoding the down-sampled point cloud by using a trained encoder and quantizing a codeword obtained by encoding, where the quantization at the moment does not need approximate processing; encoding the quantized codeword by an arbitrary entropy encoder to obtain a code stream for storage and transmission; and during decoding, carrying out entropy decoding on a code stream to obtain a codeword, and the codeword being decoded by using a decoder after training to obtain a reconstructed point cloud.

* * * * *